B. BORLAND.
CAMERA.
APPLICATION FILED MAR. 6, 1918.

1,351,279.

Patented Aug. 31, 1920.
5 SHEETS—SHEET 1.

Witness:
R. L. Farrington

Inventor,
Bruce Borland
By Glenn S. Noble
Atty

B. BORLAND.
CAMERA.
APPLICATION FILED MAR. 6, 1918.

1,351,279.                           Patented Aug. 31, 1920.
5 SHEETS—SHEET 3.

Witness:
R. L. Farrington

Inventor,
Bruce Borland
By Glenn S. Noble
Atty.

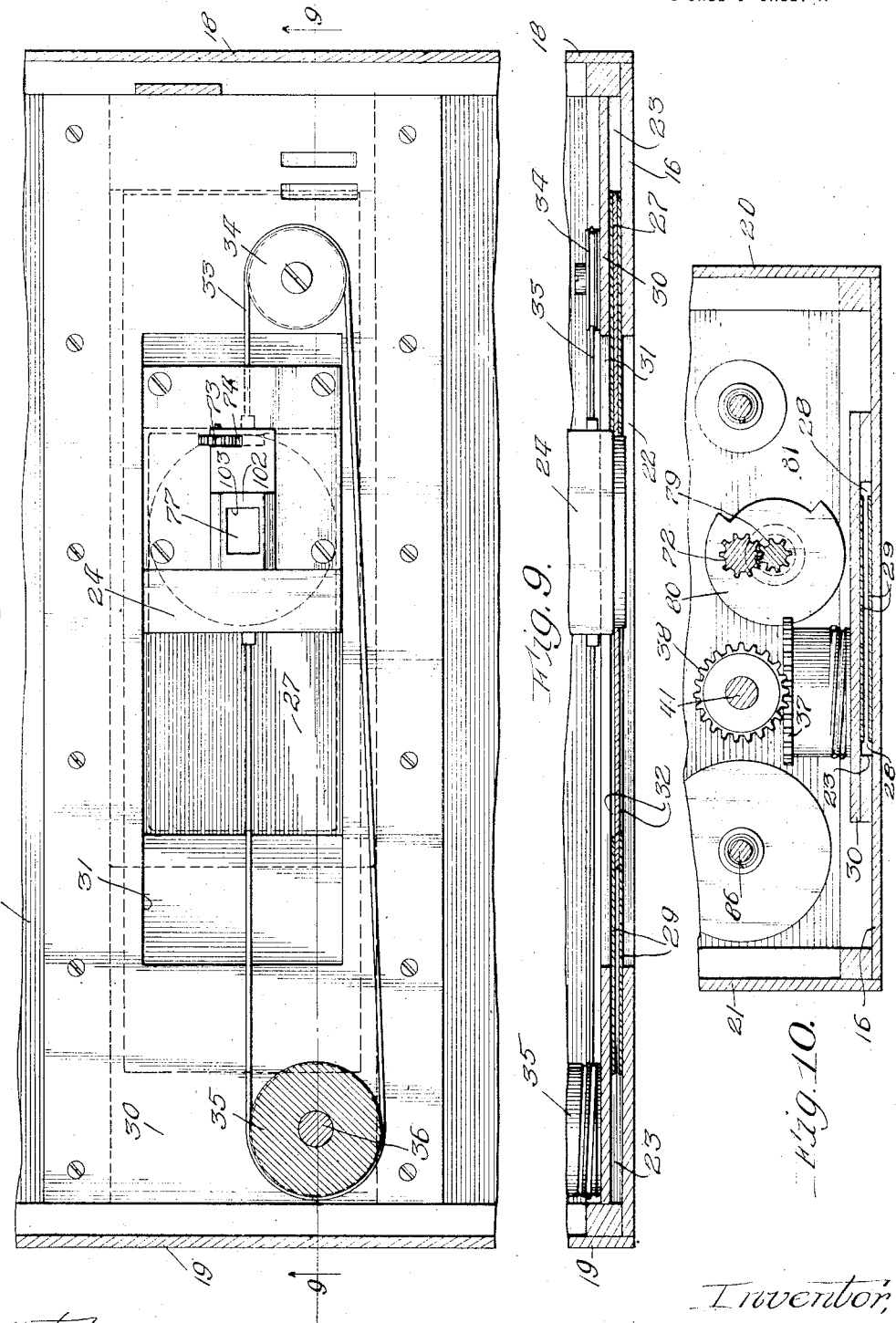

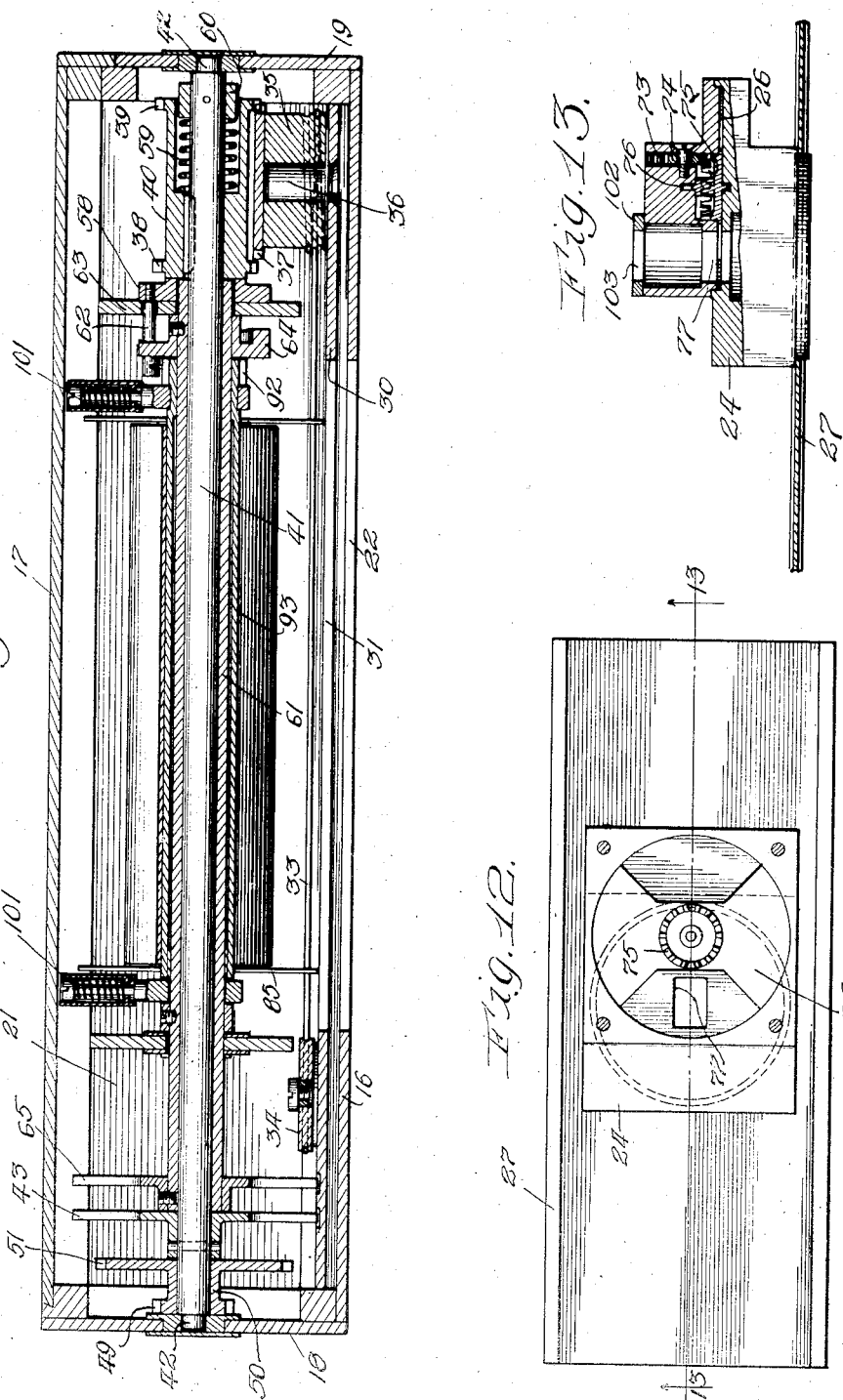

UNITED STATES PATENT OFFICE.

BRUCE BORLAND, OF CHICAGO, ILLINOIS.

CAMERA.

1,351,279.     Specification of Letters Patent.     Patented Aug. 31, 1920.

Application filed March 6, 1918. Serial No. 220,706.

*To all whom it may concern:*

Be it known that I, BRUCE BORLAND, a citizen of the United States, residing at Chicago, in the county of Cook and State of Illinois, have invented certain new and useful Improvements in Cameras, of which the following is a specification.

This invention relates more particularly to moving picture cameras of the type in which series of pictures are taken in transverse rows across the film, the film being moved longitudinally as each row is completed preparatory to taking the next succeeding row. Such a camera is shown in my prior Patent No. 1,106,076, August 4, 1914.

The objects of the present invention are to produce an improved moving picture machine or camera; to improve the general construction of cameras adapted to take a plurality of rows for pictures on a single film; to provide an improved movement for actuating an objective to give it a step by step motion across the film; and to give the film a step by step longitudinal movement with respect to the objective; and in general to provide such novel improvements and features of construction as will appear more fully from the following description.

In the accompanying drawings illustrating this invention:

Fig. 8 is a detail showing the objective carriage and some of its actuating mechanism;

Fig. 9 is a section taken on the line 9—9 of Fig. 8;

Fig. 10 is a section taken on the line 10—10 of Fig. 4;

Fig. 11 is a longitudinal section taken on the line 11—11 of Fig. 4;

Fig. 12 is a detail of the shutter; and

Fig. 13 is a section taken on the line 13—13 of Fig. 12.

Figure 1:
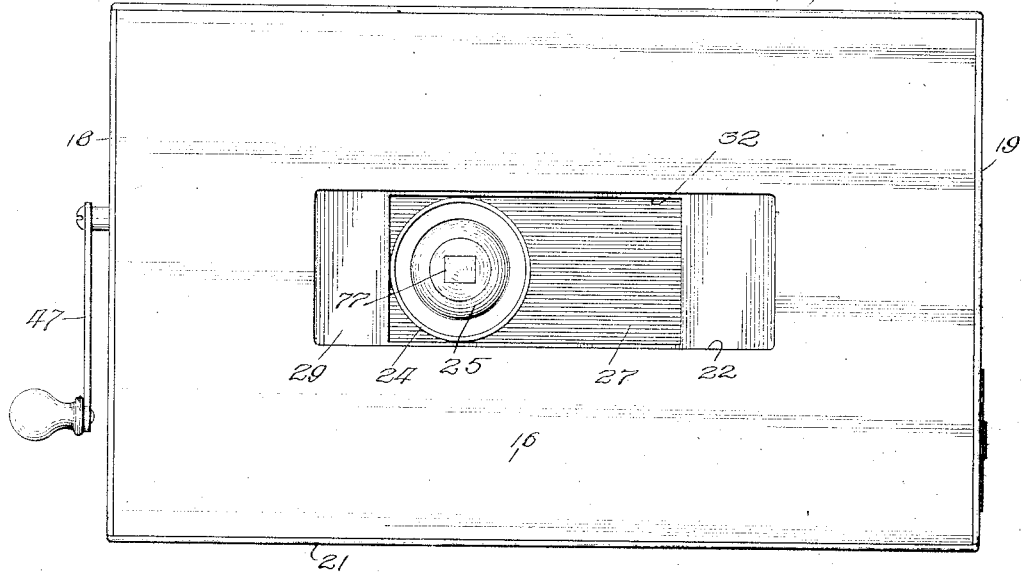
Figure 1 is a front view of the camera.
Figure 2:
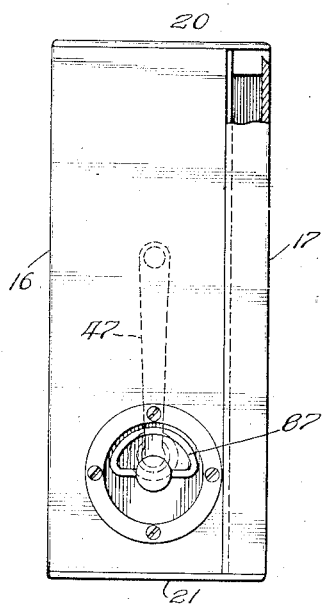
Fig. 2 is an end view taken from the right hand end, as shown in Fig. 1.

While my improved camera may, of course, be made in any desired size, these drawings are considerably enlarged from the machines which I have constructed which are adapted to utilize standard films approximately three inches in width.

As shown in these drawings, 15 represents a box or casing having a front 16, back cover 17, ends 18 and 19, top 20 and bottom 21. The front 16 is provided with an aperture 22 and has a guideway 23 on the inner side thereof for a carriage 24, which carries the lens or objective 25 and shutter 26, these parts being best shown in Figs. 8 to 13. The carriage 24 is mounted on a plate 27 which fits in the guideway 23 and serves to partially close the aperture 22. In order to avoid making the plate 27 unnecessarily long to keep the aperture closed during the transverse movement of the objective, the plate is provided with recesses 28 to receive thin auxiliary closing strips or plates 29 which fit between the plate 27 and the front 16, and between the plate and back 30 of the guideway 23, this back having an aperture 31 of the same size as the aperture 22. The strips 29 have apertures 32 which are approximately the same height as the aperture 22, but considerably shorter than the latter, as shown in Figs. 8 and 9. The plate 27 and strips 29 act in a telescopic manner as the carriage 24 moves across the aperture 22 so as to keep the aperture entirely closed at all times.

The carriage 24 is moved by means of a cable 33 which is secured to one end of the carriage, and then passes around a guide sheave or pulley 34 which is mounted on the plate 30, and then around a driving wheel or drum 35 rotatably mounted on a pin 36 which is also secured to the plate 30, the end of the cable being then fastened to the opposite end of the carriage.

It will be understood that the carriage is given a step by step movement across the aperture 22 in one direction, and then reversed and given a step by step movement in the opposite direction, the film being shifted longitudinally at the end of each transverse movement of the carriage. It will also be observed that the shutter must be actuated each time the carriage stops in its movement across the film.

The drum 35 is driven by a gear 37 which is engaged at times by one or the other of the gears 38 and 39. These gears are mounted on a sleeve 40 which is splined to a shaft 41 which extends across the camera, as shown in Fig. 11, and is mounted in bearings 42 in the ends 18 and 19. The shaft 41 is driven by means of a Geneva movement, the slotted wheel 43 being fixed to the shaft 41, while the pin 44 which turns the same is secured to a gear 45 loosely mounted on the main shaft 46, the hub of this gear coacting with the slotted wheel to lock the same between the turning movements.

Figure 3:
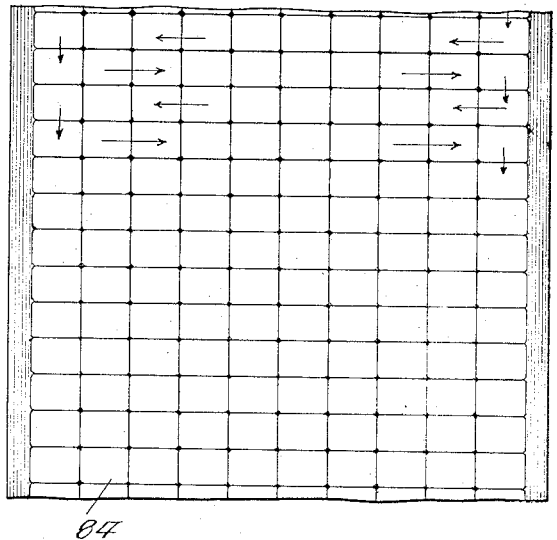
Fig. 3 is a fragment of the front of the film showing the order in which the pictures are taken.
Figure 4:
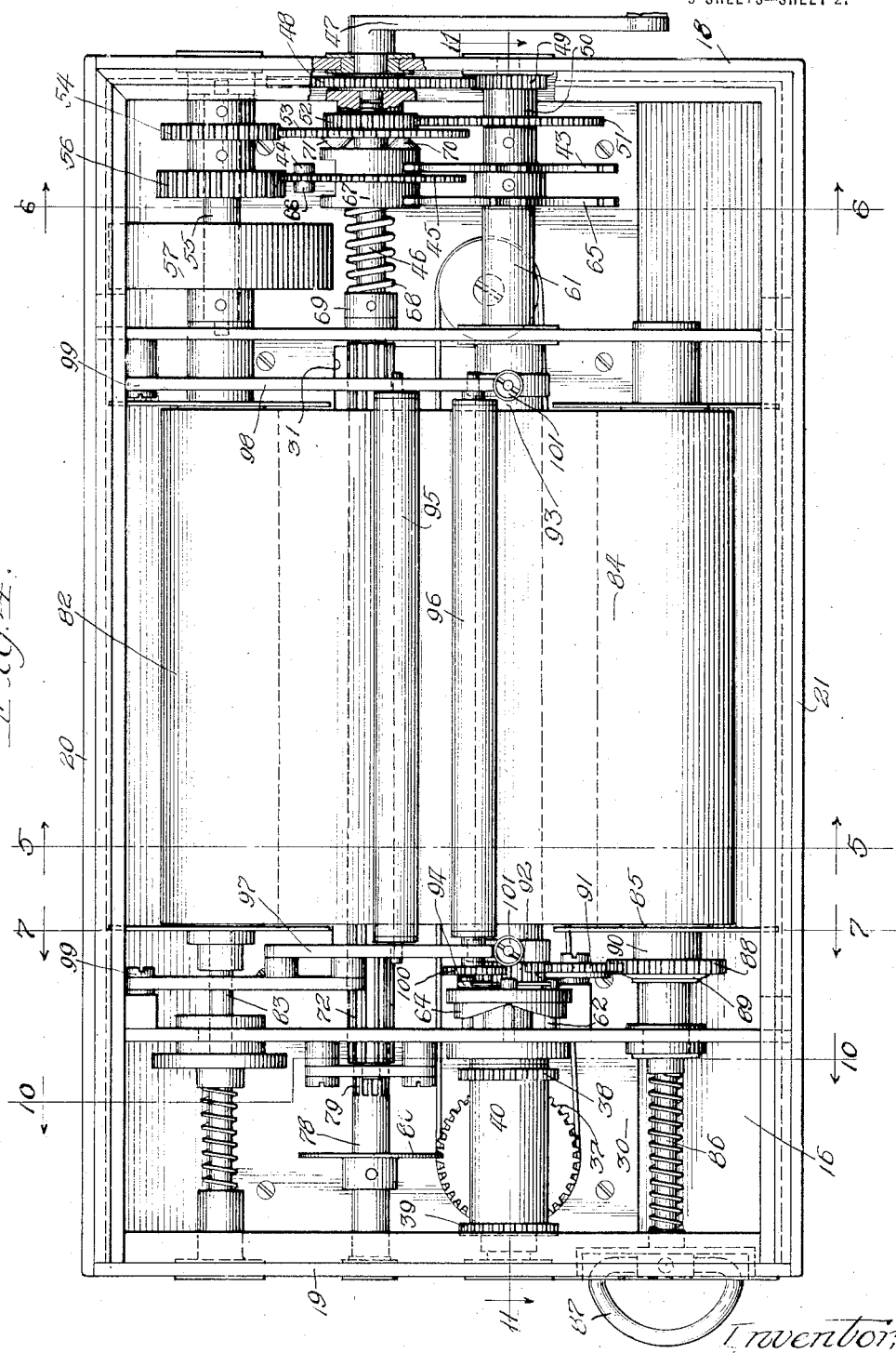
Fig. 4 is a rear view with the cover removed.

A crank 47 has a short shaft in alinement with the shaft 46, which carries a gear 48. This gear meshes with a gear 49 on a short sleeve 50 on the shaft 41. A second gear 51 is also carried by this sleeve and meshes with a gear 52 fixed on the shaft 46. A second gear 53 is also mounted on this shaft and secured to the gear 52. This gear meshes with a gear 54 on a counter shaft 55 which is mounted in the main frame portion of the camera. The shaft 55 has a wide faced gear 56 which engages with the gear 45 and drives the same. This shaft is also provided with a fly-wheel 57 which serves to steady the driving movement. By means of this arrangement, it will be noted that as the crank 47 is turned, the train of gears and the Geneva movement will turn the shaft 41 with its sleeve 40 with an intermittent motion, so that if either of the gears 38 or 39 is in mesh with the gear 37, the latter will be turned intermittently to move the objective across the camera. Assuming that the gear 39 is in mesh when the second row of pictures are being taken, as indicated in Fig. 3, this step by step movement is repeated as many times as there are pictures to be taken in the transverse row. When the last picture in this row is made, the film is shifted longitudinally and then the objective is moved step by step in the opposite direction, as indicated by the third row in Fig. 3. The reverse movement is accomplished by shifting the sleeve 40 to bring the gear 38 into mesh with the gear 37. The sleeve 40 is normally pressed against a collar 58 by means of a spring 59 which presses against a collar 60 on the shaft 41. The collar 58 is loosely mounted on a sleeve 61 on the shaft 41 and has a plurality of pins 62 which project through holes in a cross piece 63 forming a part of the frame. These pins prevent the turning of the collar and serve to move it longitudinally to shift the sleeve 40. The ends of these pins engage with a face cam 64 which has a plurality of uniformly spaced cams corresponding with the number of pins in order to prevent binding. This cam is securely fixed to the sleeve 61. The sleeve 61 is rotated at times by means of a Geneva movement, the slotted wheel 65 thereof being secured to said sleeve while the pin 66 which turns the same is secured to the gear 45, as shown in Fig. 4, and the hub 67 of this gear also coacts with the wheel 65 to lock the same between the turning movements. This hub is normally pressed toward the right, as shown in Fig. 4, by means of a spring 68, which abuts against a collar 69 on the shaft 46.

The gear 45 with the pins 44 and 66 mounted thereon is shifted by means of cams or lugs 70 and 71, the former being fixed on the hub 67 while the latter is fixed to the gear 53. The gears are so proportioned that the gear 45 turns faster than the gear 53 so that when the last picture in a transverse row has been taken, the cam 70 will engage with the cam 71 and will force the hub 67 with the gear 45 to the left as shown in Fig. 4, so that the pin 44 will not engage with the wheel 43, but the pin 66 will engage with the wheel 65 so as to turn the sleeve 61 and the face cam 64. The cam 64 is moved far enough so that ends of the pins 62 will rest against the high parts of the cam, and will hold the collar 58 and sleeve 40 toward the right as shown in Fig. 11, to bring the gear 38 into mesh with the gear 37. As soon as the cam or projection 70 passes the projection 71, the spring 68 moves the gear 45 back to its original position so that the pin 44 again engages with the wheel 43 and rotates the shaft 41 which causes the objective to move back across the camera with an intermittent motion while the next row of pictures is taken. As soon as this row is completed, the gear 45 is again shifted and the face cam 64 is again actuated to permit the sleeve 40 to return to its first described position preparatory for making the next row of pictures.

The shaft 46 is provided with a long gear 72 for operating the shutter 26. This gear meshes with a gear 73 which is mounted on a pin in the carriage 24. The gear 73 meshes with a second gear 74 which meshes with a gear 75 which is mounted on the shaft 76 which carries the shutter 26. The shutter 26 is mounted adjacent to the light aperture 77, and is adapted to open and close the same at the proper times. It will be noted that the shutter is constantly driven, but its movement is timed so that the exposure will be made during the intervals of rest of the carriage 24 as it moves across the film.

In order to hold the carriage positively during the positions of rest, and to prevent lost motion, I provide an auxiliary lock or escapement for holding the same. A counter shaft 78 is mounted adjacent to the gear 37, as shown in Figs. 4 and 10 and is provided with a gear 79 which meshes with the end of the gear 72, the gear 79 being somewhat smaller so that the shaft 78 is turned more rapidly. This shaft carries an escapement wheel or disk 80 which is cut away for a portion of the distance around the periphery as indicated at 81. The movement of this wheel is timed so that it will engage with the gear 37 and lock the same against turning, as shown in Fig. 4, during the intervals of rest of the carriage, but when the gear is to be turned and the carriage moved, the cut away portion 81 will permit the turning of said gear.

The film supply roll 82 is carried in any suitable manner as by means of the usual stub shafts, one of which 83 is preferably spring pressed so as to permit the ready insertion and removal of the roll or spool. The film 84 is wound up on a second roll or spool 85 which is also mounted on the usual stub shafts one of which 86 is spring pressed to permit the removal of the film. This shaft is provided with a handle 87 which fits in a recess in the end of the camera, but which may be swung out to turn the spool or to pull the shaft to release the spool. The shaft 86 is also provided with a gear 88 which is held in frictional engagement with the shaft as by means of a spring washer 89, which presses the gear against the collar 90 on said shaft so that the shaft will be turned by the gear. This gear engages with an intermediate gear 91 which in turn meshes with a gear 92 on a sleeve 93, which is loosely mounted on the sleeve 61. The gear 92 is driven by a pawl or dog 94 mounted on the back of the cam 64.

Figure 5:
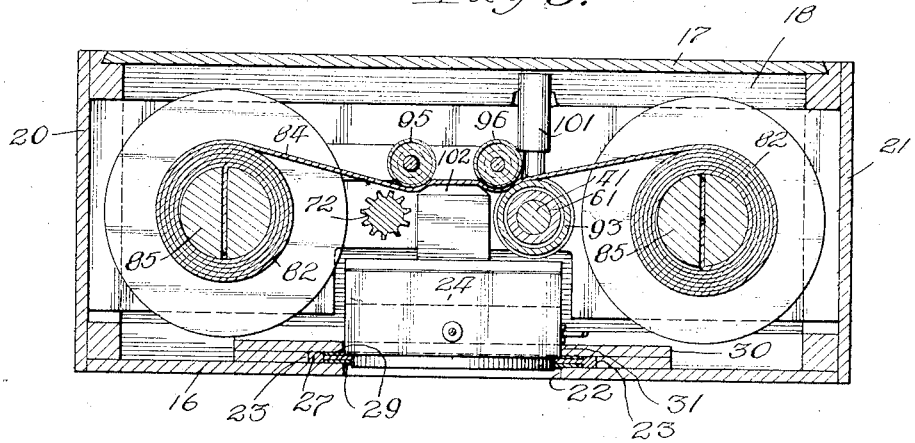
Fig. 5 is a section taken on the line 5—5 of Fig. 4.
Figure 6:
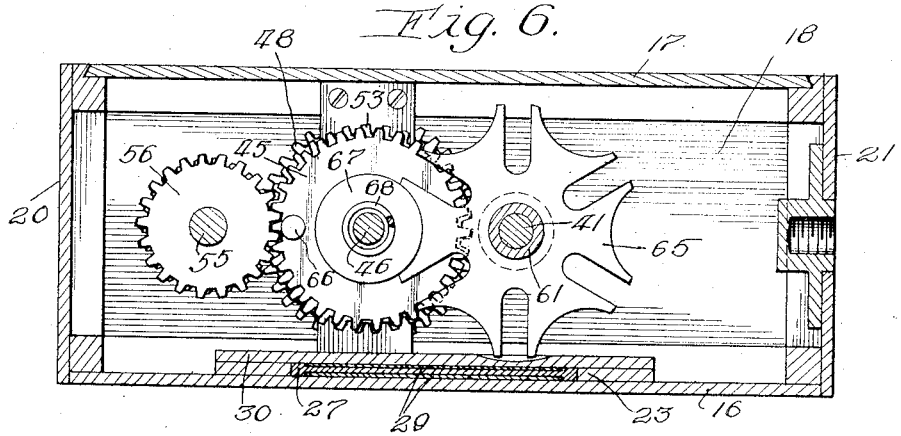
Fig. 6 is a section taken on the line 6—6 of Fig. 4.
Figure 7:
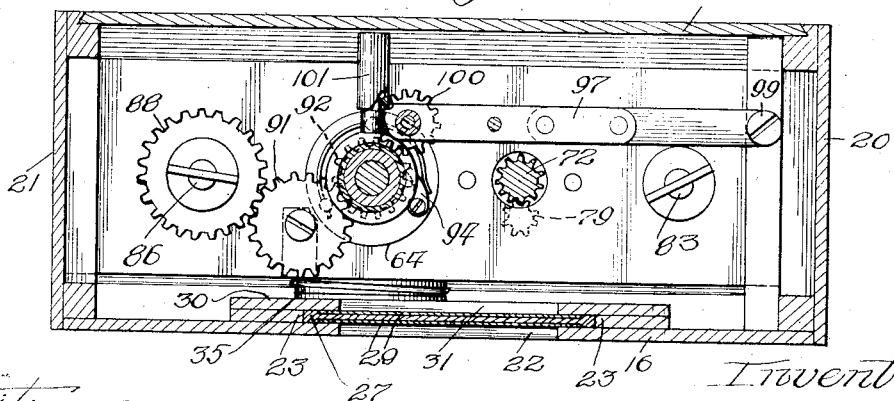
Fig. 7 is a section taken on the line 7—7 of Fig. 4.

Two guide rollers 95 and 96 are mounted in arms 97 and 98 which are pivoted at 99 to the upper portion of the frame of the camera. One of these rollers 96 is driven by gear 100, which meshes with the gear 92, and coacts with the sleeve or roller 93 to feed the film through the camera The gear which drives the spool 85 is preferably proportioned so that it will take up all of the slack, and as the roll increases in size, slippage is provided by the friction washer 89. Spring catches 101 are mounted, as shown in Fig. 11, and engage with the free ends of the arms 97 and 98 to press the guide rollers against the film. The carriage 24 is provided with an aperture 103 corresponding in size and shape to the picture to be taken. It will be noted from Fig. 5 that the guide rollers hold the film pressed closely against this projection, so that the exposure will be confined to the light opening, and there will be no danger of fogging the film.

Assuming that the film is in position and the objective in position to start making a transverse row of pictures, the turning of the crank 47 will rotate the long gear 72 and will open and close the shutter to make the first exposure. As soon as the pin 44 engages the wheel 43, the latter will be turned to actuate the objective shifting mechanism and shift the objective or lens one step to the right, as shown in the second row of Fig. 3. As soon as the objective reaches this position, it is locked by the escapement 80 and held in such position until the shutter is again actuated to make the next exposure and this is repeated until the row of pictures is completed. The pin 66 then engages with the wheel 65 to shift the cam 64 to reverse the movement of the objective. Simultaneously the film feed rollers are actuated, and the film is moved longitudinally preparatory to taking the next row. The step by step movement and repeated exposures then continues to make the next transverse row of pictures as the objective moves across the film to the left, as shown in Fig. 3, and these operations may be continued until the film has all been exposed, or the desired number of pictures taken.

It will be observed that various changes may be made in the details of construction and arrangement of parts without departing from the spirit of this invention, and therefore I do not wish to be limited to the particular construction herein shown and described, except as specified in the following claims, in which I claim:

1. The combination with a camera of the type in which the objective is moved relatively to the film, and having driving mechanism for actuating the objective, of means separate from the driving mechanism for positively locking the objective during the periods of exposure whereby the objective is held rigidly in proper position.

2. In a moving picture camera, the combination with the lens, of means including driving means for moving the same intermittently across the film, and an escapement separate from the driving mechanism for locking the lens positively between the movements.

3. In a moving picture machine, the combination of a casing having an aperture in front thereof, a carriage mounted on the front and adapted to move along said aperture, means for keeping the aperture closed as the carriage moves along the same, a lens mounted in said carriage, a cable attached to said carriage, a guide wheel for said cable, a drum for operating the cable, and means for turning the drum intermittently in one direction and then reversing the moving and turning the drum intermittently in the opposite direction.

4. The combination with a camera having a lens supporting carriage adapted to move transversely, a cord secured to said carriage for moving the same, a guide wheel for said cord, a driving wheel for said cord, a gear for turning said driving wheel, means for intermittently actuating said gear, and an escapement coacting with said gear to lock the same between the intermittent movements.

5. In a moving picture camera, a carriage, an objective mounted in said carriage, a cord for moving said carriage, a driving wheel for said cord, a gear for turning said wheel, a pair of gears mounted upon a common axis and adapted to engage at times with said first named gear, a main driving shaft, means for turning the last named gears from the driving shaft with an intermittent motion, and means for shifting said last named gears to reverse the movement of the first named gear.

6. In a moving picture machine, the combination of a carriage, an objective mounted in said carriage, a cable connected with said carriage and adapted to actuate the same, a driving wheel for said cable, a gear for turning said wheel, a shaft arranged adjacent to said gear, a sleeve splined on said shaft, gears at either end of said sleeve adapted to engage at times with the first named gear, means for imparting an intermittent rotary movement to said shaft, and means for automatically shifting the sleeve after the shaft has been given a predetermined number of movements, to cause the gears carried by said sleeve to alternately engage with and be disengaged from said first named gear.

7. In a moving picture machine, the combination of a laterally movable objective support, a cable for actuating said support, a drum for driving said cable, a gear secured to said drum, a transverse shaft mounted adjacent to said gear, a sleeve splined on said shaft, gears at either end of said sleeve adapted to engage alternately with said first named gear, a spring tending to hold said sleeve in normal position with one of the gears thereon in engagement with the first named gear, a cam and connections for shifting said sleeve to disengage one of its gears and throw the other gear into engagement with the first named gear, a main driving shaft, a Geneva movement actuated by said main driving shaft for intermittently turning the first named shaft, a second Geneva movement operated by said main driving shaft for turning said cam, and automatic means for throwing the first named movement out of operation at the end of predetermined periods and momentarily throwing the second named movement into operation to actuate the cam and then throwing the first named movement again into operation.

8. An operating mechanism for a moving picture machine comprising a main driving shaft, a gear mounted on said shaft, means for turning said gear, a projection on said gear, a second gear freely mounted on said shaft and having a cylindrical hub, a projection on said hub adapted to engage at times with said first named projection to shift the hub, a spring tending to hold said hub in normal position, a train of gears connecting said first named and second named gears and adapted to turn the latter at a predetermined different speed than the former so that said projections will coact at times to shift the hub with the gear thereon, a second shaft, a slotted wheel of the Geneva type secured to said second shaft and coacting with said hub, a tube mounted on said second named shaft, a second slotted wheel of the Geneva type secured to said tube and coacting with said hub, pins on said second named gear for engagement with said slotted wheels, the arrangement being such that after the first named wheel has been actuated a predetermined number of times, the hub will be shifted to throw its actuating pin out of engagement and to throw the actuating pin for the second slotted wheel into engagement to turn the second slotted wheel, a sleeve slidably mounted on said second named shaft, gears at either end of said sleeve, a spring tending to hold said sleeve in normal position, a cam on the end of said tube, connections between the cam and sleeve whereby the latter will be shifted when the cam is turned, a gear arranged adjacent to the gears on said sleeve and adapted to be engaged at times by one or the other of said gears to drive it in reverse directions, a drum actuated by said last named gear, a slidable objective support, and means connecting said drum and support for actuating the latter, the arrangement being such that when the main shaft is turned said support will be given an intermittent motion and will be reversed after being moved a predetermined number of times.

9. A moving picture machine having a laterally movable objective with a portion adapted to engage with the film, guide rollers for holding said film yieldingly against said engaging portion, a feed roller for said film and means for driving one of said guide rollers to cause it to coact with the feed roller for moving the film.

10. In a moving picture camera, the combination of a pair of Geneva movements having a single driving wheel adapted to engage with one or the other of the driven wheels, means for turning said driving wheel, means for shifting the driving wheel at times to bring it into engagement with one or the other of said driven wheels, means actuated by one of said driven wheels for giving a step by step movement to the objective, and means actuated by the second driven wheel for reversing the step by step movement of the objective, and means also actuated by said second driven wheel for feeding the film longitudinally.

BRUCE BORLAND.